United States Patent
Kenworthy (10) Patent No.: US 6,718,553 B2
(45) Date of Patent: Apr. 6, 2004

(54) CENTRALIZED AGGREGATION OF BROADCAST TELEVISION PROGRAMMING AND MULTI-MARKET DIGITAL DELIVERY THEREOF OVER INTERCONNECTED TERRESTRIAL FIBER OPTIC NETWORKS

(75) Inventor: Kevin Kenworthy, Gallatin, TN (US)

(73) Assignee: Complete TV LLC, Nashville, TN (US)

( * ) Notice: Subject to any disclaimer, the term of this patent is extended or adjusted under 35 U.S.C. 154(b) by 0 days.

(21) Appl. No.: 10/165,291

(22) Filed: Jun. 6, 2002

(65) Prior Publication Data

US 2002/0188953 A1 Dec. 12, 2002

Related U.S. Application Data (60) Provisional application No. 60/296,297, filed on Jun. 6, 2001.

(51) Int. Cl.[7] ............................................. H04N 7/173
(52) U.S. Cl. ................. 725/118; 725/114; 725/128; 725/138; 725/148; 709/249
(58) Field of Search ........................... 725/114, 118, 725/119, 129, 138, 144, 148, 36; 709/249

(56) References Cited

U.S. PATENT DOCUMENTS

| | | | | |
|---|---|---|---|---|
| 4,709,418 A | * | 11/1987 | Fox et al. .................... 398/67 |
| 4,763,317 A | | 8/1988 | Lehman et al. ............... 370/58 |
| 4,994,909 A | | 2/1991 | Graves et al. ................. 358/86 |
| 5,136,411 A | * | 8/1992 | Paik et al. .................... 398/72 |
| 5,262,883 A | * | 11/1993 | Pidgeon ........................ 398/71 |
| 5,283,639 A | * | 2/1994 | Esch et al. .................... 725/32 |
| 5,303,229 A | | 4/1994 | Withers et al. ............. 370/58.1 |
| 5,361,091 A | * | 11/1994 | Hoarty et al. ............... 725/119 |
| 5,387,927 A | * | 2/1995 | Look et al. .................. 725/114 |
| 5,490,007 A | | 2/1996 | Bennett et al. .............. 359/139 |
| 5,544,164 A | * | 8/1996 | Baran .......................... 370/397 |
| 5,572,347 A | * | 11/1996 | Burton et al. .................. 398/71 |
| 5,574,495 A | * | 11/1996 | Caporizzo .................... 725/107 |
| 5,586,121 A | * | 12/1996 | Moura et al. ................ 370/404 |

(List continued on next page.)

FOREIGN PATENT DOCUMENTS

| | | |
|---|---|---|
| WO | WO 96/14712 | 5/1996 |
| WO | WO 00/64174 | 10/2000 |

OTHER PUBLICATIONS

T. Ohtsuka et al. "Digital Optical CATV System Using Hubbed Distribution Architecture", Journal of Lightwave Technology, vol. 6, No. 11, Nov. 1988, pp. 1728–1736.

Primary Examiner—Andrew Faile
Assistant Examiner—Jason Salce
(74) Attorney, Agent, or Firm—Sutherland Asbill & Brennan LLP

(57) ABSTRACT

Systems and end-to-end methods for delivering digital aggregated broadcast television programming from a centralized aggregation headend to subscribers in multiple markets using an interconnected terrestrial fiber optic network. A centralized aggregation headend receives multiple multi-market broadcast television signals from multiple content providers. The multiple broadcast television signals are aggregated into a digital aggregated content bundle. The digital aggregated content bundle is prepared for transport over an interconnected long-haul fiber optic network, comprising multiple fiber optic networks interconnected by a plurality of interconnection points of presence. The digital aggregated content bundle is transported over the interconnected long-haul fiber optic network to local/metro PoPs in multiple markets. The local/metro PoPs are interconnected with central offices and/or other local facilities for last-mile delivery of the digital aggregated content bundle to subscriber premises. Local programming content and local advertising segments may be added to the digital aggregated content bundle at a local integration headend.

16 Claims, 5 Drawing Sheets

U.S. PATENT DOCUMENTS

| | | | | |
|---|---|---|---|---|
| 5,592,477 A | * | 1/1997 | Farris et al. | 370/396 |
| 5,659,351 A | * | 8/1997 | Huber | 725/101 |
| 5,768,279 A | * | 6/1998 | Barn et al. | 370/486 |
| 5,880,864 A | | 3/1999 | Williams et al. | 359/124 |
| 5,926,547 A | * | 7/1999 | Heieis et al. | 380/210 |
| 5,959,660 A | * | 9/1999 | Levan | 725/131 |
| 5,969,836 A | * | 10/1999 | Foltzer | 398/72 |
| 6,154,632 A | * | 11/2000 | Hata et al. | 455/3.01 |
| 6,154,772 A | * | 11/2000 | Dunn et al. | 725/114 |
| 6,198,558 B1 | | 3/2001 | Graves et al. | 359/137 |
| 6,295,148 B1 | * | 9/2001 | Atlas | 398/9 |
| 6,466,971 B1 | * | 10/2002 | Humpleman et al. | 709/220 |
| 6,519,773 B1 | * | 2/2003 | Ahmed et al. | 725/118 |
| 6,523,177 B1 | * | 2/2003 | Brown | 725/121 |
| 6,546,016 B1 | * | 4/2003 | Gersberg et al. | 370/401 |
| 6,546,419 B1 | * | 4/2003 | Humpleman et al. | 709/223 |

\* cited by examiner

CENTRALIZED AGGREGATION OF BROADCAST TELEVISION PROGRAMMING AND MULTI-MARKET DIGITAL DELIVERY THEREOF OVER INTERCONNECTED TERRESTRIAL FIBER OPTIC NETWORKS

RELATED APPLICATIONS

This application claims the benefit of U.S. Provisional Patent Application Ser. No. 60/296,297, filed Jun. 6, 2001, which is hereby incorporated by reference as if set forth fully herein.

TECHNICAL FIELD

The present invention relates generally to the digital delivery of broadcast television programming to multiple markets from a centralized headend. More particularly, the present invention relates to the collection and aggregation of broadcast television programming at a centralized headend, and delivery of a digital aggregated content bundle to subscribers in multiple markets via a closed wide area network derived from available fiber optic assets of communication network providers.

BACKGROUND OF THE INVENTION

A variety of systems have heretofore been used to deliver forms of digital broadcast television programming to subscribers. For example, compressed digital video has been delivered to subscribers using a variety of media, including coaxial cable, fiber optic cable and satellite links. Cable television systems, digital satellite television systems (also called digital broadcast systems or "DBS") and telco video services each employ content delivery models that involve aggregation of programming content from multiple content providers and delivery of the aggregated programming content to subscriber premises. However, the content delivery models of cable television system, DBS and telco video services each suffers from one or more drawbacks including transmission distance or environmental limitations on signal quality, inefficiencies of multiple headends, vulnerability to security breaches or the inability to insert local content into an aggregated national content bundle downstream from a single centralized headend.

In particular, in cable television systems, content is aggregated at a local or regional headend and is retransmitted only to subscribers within the regional or local market. Reasons for these limits are largely based on content licensing, local franchise and system technical engineering restrictions. More specifically, typical cable television system content licenses historically permit the distribution of originating content to consumers attached to Multiple System Operations ("MSO") that are designated within individual television distribution markets. These systems contain small scale, individual downlink aggregation headends for each distribution area or market. Additionally for reasons based on engineering limits on the physical distribution distances and the one-to-many broadcast model, signal degradation is a significant issue for cable television systems. In order to maintain acceptable signal quality, cable television companies are often forced to construct multiple headends within the same distribution market and/or amplify the signal's strength. Further, in order for a single cable company to reach multiple markets, it would have to construct additional headends within in each of the intended markets for the same reasons stated above.

By building multiple headends, costs are increased for both the initial capital build as well as any subsequent upgrades or rehabs. Coinciding with the cost of building multiple headend systems are related costs to staffing and maintaining the business operation necessary to keep these facilities running. Broadcast technology employed by cable television systems results in all available programming content being continually provided to all subscribers, regardless of whether they have paid for all available content. Filtering and/or scrambling technology must therefore be employed at subscriber premises to block the unauthorized viewing of programming content. Most filtering and/or scrambling technology can be circumvented, leading to an insecure system and often causing the content provider to add a revenue-loss factor into cable television pricing models.

A small antenna, or dish, consumer DBS service provides the ability to centrally aggregate television programming content at a single headend. The aggregated programming content can be rebroadcast from the single headend to subscribers in multiple markets using multiple satellites and/or satellite transponders. Programming content can be delivered to DBS service subscribers having a small satellite antenna with an uninterrupted direct line of site to the transmitting satellite. However, a drawback of the DBS architecture is that local or regional content cannot be introduced into the centrally aggregated programming content downstream from the headend, i.e., at the local or regional level. Any local or regional programming content to be provided to local or regional subscribers must be received at a remote site in the local market, transmitted from the remote site to the headend for aggregation with the national programming content, and then retransmitted back to the original local market as part of the aggregated content bundle.

Because all of the available programming is simultaneously beamed to all subscribers, bandwidth allocation, and therefore, channel capacity, becomes a critical limitation of DBS. For example, during peak usage times or during simultaneous broadcast of multiple channels of high-bit rate programming like special sports programming packages, additional bandwidth must be made available to certain channels. Because the amount of available transponder bandwidth is fixed by physical limitation, the bandwidth available for other channels must be statistically reduced, resulting in loss of picture quality. Another drawback of DBS is that reception quality in general depends on proper installation of the satellite antenna and environmental conditions as previously described. Furthermore, as in cable television systems, or in any system in which all channels are delivered to all customers, DBS systems are vulnerable to breaches of security.

In recent years, telephone companies (Telcos) have been encouraged to deploy advanced broadband systems that include competitive video services to their traditional phone service customers. Systems have recently been introduced to deliver these broadband video services to subscribers over services commonly referred to in the telco industry as "last-mile" technologies, such as xDSL (all DSL). Makers of known last-mile systems have invented or perfected technologies that are positioned to receive services like aggregated programming content and to distribute those services to their customers. Content is designed to be received in an acceptable format in its already aggregated form and then disseminated to consumers through these last-mile technologies.

However, last-mile systems, as they stand alone, do not provide an end-to-end system that includes in its design all of the components and methods for providing video content to end users. In particular, last-mile delivery systems do not address the inefficiencies of multiple headend cable television systems or the affects of weather on signal quality in DBS systems. Therefore, these known last-mile transport systems fall short in that they do not provide solutions to the inefficiencies and drawback of cable television systems or DBS systems.

Accordingly, there remains a need for a system and method for delivering broadcast television programming from a centralized headend to subscribers in multiple markets, while avoiding the aforementioned drawbacks of cable television and DBS systems. There further remains a need for an end-to-end content delivery system and method that can rely on existing and emerging last-mile transport delivery systems employed by Telcos.

SUMMARY OF THE INVENTION

The present invention satisfies the above described needs by providing systems and end-to-end methods for delivering broadcast television programming to subscribers in multiple markets using an interconnected terrestrial fiber optic networks. A centralized aggregation headend receives multiple broadcast television signals, comprising multi-market programming content, from multiple content providers. The centralized aggregation headend aggregates the multiple broadcast television signals into a digital aggregated content bundle. The digital aggregated content bundle is prepare for transport over an interconnected long-haul fiber optic network, which comprises multiple fiber optic networks that are interconnected by a plurality of interconnection points of presence (IPoPs). The digital aggregated content bundle is transported over the interconnected long-haul fiber optic network to a plurality of local or metro PoPs (L/M PoPs), each of which is located in a different market.

Broadcast television signals may be received at the centralized aggregation headend as analog signals, digital signals and/or high definition television signals. Analog signals are converted to digital signals prior to creation of the aggregated content bundle, so that the aggregated content bundle can be created in a digital format that is widely compatible with fiber optic networking technologies. For example, the aggregated content bundle may comprise a plurality of MPEG-2 digital signals and may have an ATM-based transport format. This digital aggregated content bundle may be passed through a multi-market ad insertion loop at the centralized aggregation headend for insertion of multi-market advertising segments and other multi-market insertion content into the multi-market programming.

A plurality of central offices are interconnected with at least one of the L/M PoPs via one or more local fiber optic systems. Equipment in each of the central offices is configured for receiving the digital aggregated content bundle via at least one of the local fiber optic systems and for transporting the digital aggregated content bundle to the subscriber premises via a last-mile transport system. A local integration headend may be located in one or more of the central offices or in a facility that is accessible to the local fiber optic network via a L/M PoP. The local integration headend may be configured for receiving the digital aggregated content bundle prior to transport thereof to the subscriber and for adding local programming content to the digital aggregated content bundle. The local integration headend may also be configured with a local ad insertion loop for inserting local advertising and other local insertion content into the local programming content and/or the multi-market programming content within the digital aggregated content bundle. The local integration headend may further be configured for integrating data services, two-way video services, and/or telephony services with the digital aggregated content bundle.

End-to-end customer service is provided by way of a network management/customer service integration server that is in communication with a plurality of network management systems. A network management system may be located at the centralized aggregation headend, at each of the IPoPs, at the plurality of L/M PoPs, at the plurality of central offices, at one or more segments of the interconnected long-haul fiber optic network and at one or more segments of each local fiber optic system. The network management systems may communicate with the network management/customer service integration server, for example, via the Internet or other data network. The network management/customer service integration server receives state and status data from each of the network management systems and integrates the states and status data for presentation to a customer service representative through a user interface. The network management/customer service integration server may host a web-based user interface that is accessible by a customer service terminal executing a browser and connected to the data network.

These and other aspects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from a reading of this detailed description.

BRIEF DESCRIPTION OF THE DRAWINGS

A full and enabling disclosure of the present invention, including the best mode thereof directed to one of ordinary skill in the art, is set forth in the specification, which makes reference to the appended figures, in which.

DETAILED DESCRIPTION OF THE PREFERRED EMBODIMENTS

The present invention provides systems and overall integration methods (end-to-end methods) for centralized aggregation of broadcast television programming originated by multiple content providers and for delivery of a digital aggregated content bundle to subscribers in multiple markets over terrestrial interconnected fiber optic networks. A centralized aggregation headend is employed to gather and aggregate broadcast television programming. The term broadcast television programming (also referred to herein as "content.") is intended to mean full-frame consumer receivable television content with audio. Multiple content feeds are received at the centralized aggregation headend and are decrypted, converted, encoded, rate shaped, formatted and/or re-encrypted, as appropriate, and aggregated into a single digital content bundle.

The digital aggregated content bundle is then distributed to multiple markets over interconnected long-haul fiber optic networks. As used herein, the terminology "interconnected long-haul fiber optic network" is intended to refer to multiple fiber optic networks that can be interconnected or that are already interconnected at various points, such as Carrier Hotels and other communication network points of presence ("PoP") to create a very wide (i.e., long-haul) area network. Interconnection points, such as "Carrier Hotels" and other communication network PoPs are referred to herein collectively as "interconnection PoPs" or "IPoPs." IPoPs typically house the network termination, interconnection and/or continuation points for numerous fiber optic networks. This interconnecting represents the creation of the very wide area network necessary for the long-haul distribution system of the present invention. Stated another way, an interconnected long-haul fiber optic network is a closed wide area network derived from available fiber optic assets from one or more communication network providers.

By interconnecting existing, emerging or specifically contracted or constructed fiber optic networks, the digital aggregated content bundle can be distributed nationwide or even internationally. Content distributed from the centralized aggregation headend is multi-market content, meaning that it is intended for audiences in multiple markets or national or international markets. When introduced into a particular regional or local market, regional or local programming content may be added into the digital aggregated content bundle. In addition, telephony services, data services and other video services, such as video-on-demand and video conferencing, may be integrated along with the digital aggregated content bundle before it is delivered to subscribers using appropriate "last-mile" technologies. As will be appreciated by those of ordinary skill in the art, the term "last-mile" generically refers to telecommunications-based access to the subscriber's premise.

Reference is hereinafter made in detail to presently preferred embodiments of the invention, one or more examples of which are illustrated in the accompanying drawings. Repeated use of reference numerals in the present specification and drawings is intended to represent the same or analogous features or elements of the invention. Each exemplary embodiment, component and element of the present invention is described by way of an explanation of the invention, as opposed to a limitation of the invention. In fact, it will be apparent to those skilled in the art that modifications and variations can be made in the present invention without departing from the scope or spirit thereof. For instance, features illustrated or described as part of one embodiment may be used in connection with another embodiment to yield still further embodiments. Thus, it is intended that the present invention covers such modifications and variations as come within the scope of the appended claims and their equivalents.

Although not shown in detail in the figures, those skilled in the art will recognize that communication networks generally comprise hardware and software for transmitting and receiving propagated signals. A communication network system or device, such as a headend, router, switch, hub, set top box, server, etc. typically includes communication components for receiving and retransmitting live streams of data, a memory for storing data and/or computer-executable instructions, a processor for executing computer-executable instructions and other internal and/or peripheral components that are well known in the art. A memory may be any well-known form of computer-readable medium, including RAM and/or ROM. A propagated data signal is also considered to be a computer readable medium, in that it may contain or be encoded with data structures representing data and/or computer-executable instructions.

Figure 1:
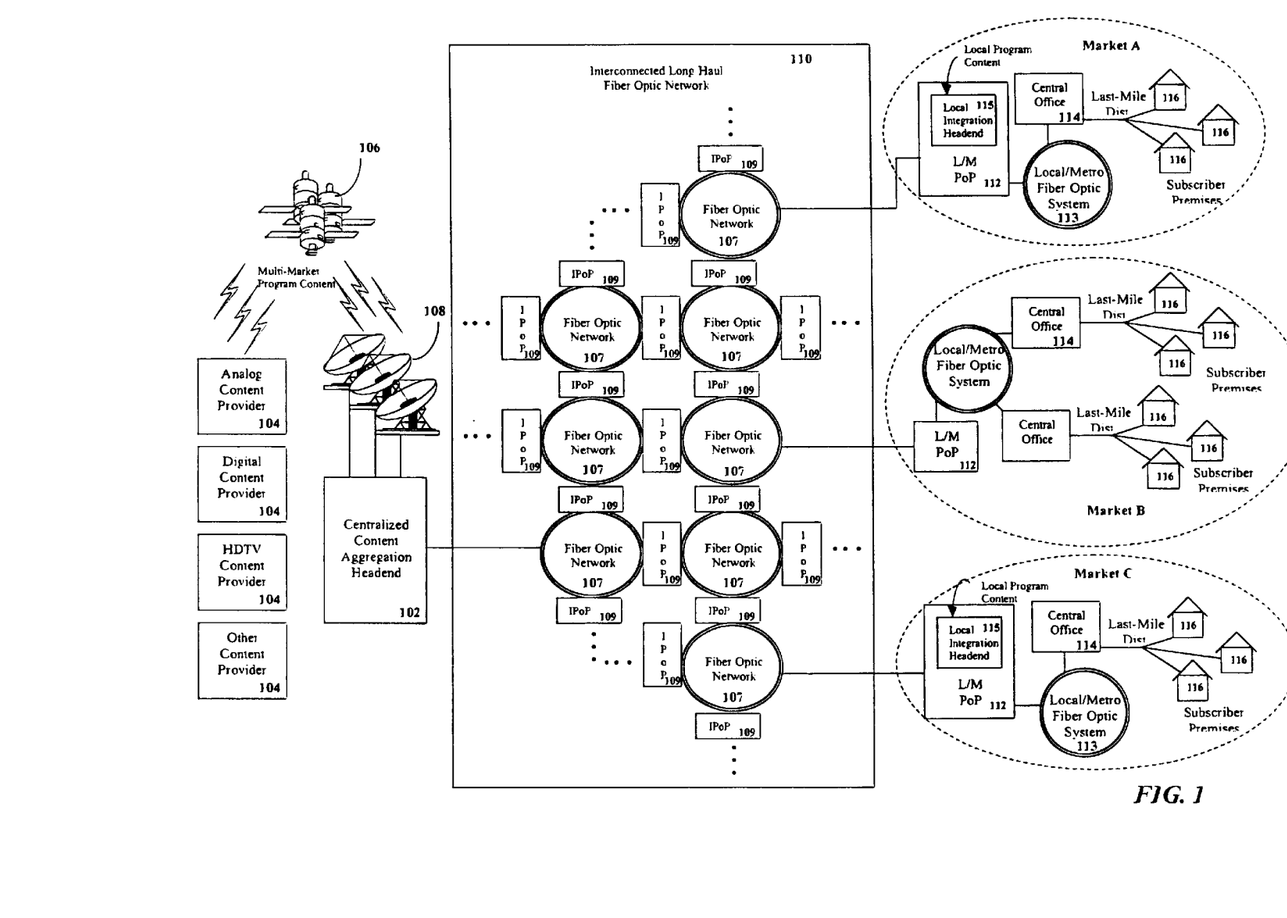
FIG. 1 is a schematic illustration of a network system architecture according to exemplary embodiments of the present invention.

FIG. 1 illustrates an exemplary network topology of the present invention. As shown, a centralized aggregation headend 102 is configured to receive multiple signals containing multi-market content from multiple multi-market content providers 104. Each multi-market content provider 104 transmits multi-market content to the centralized aggregation headend 102 by way of satellites 106 or any other suitable communications link, including fiber optic cable. In one embodiment, an array of satellite antennas 108 is connected to receivers within the centralized aggregation headend 102 in order to receive multi-market content feeds from multi-market content providers 104. Multi-market content providers 104 are herein intended to represent originators of television programming, such as ESPN, HBO, TNN, etc.

The centralized aggregation headend 102 may receive multi-market content from the multi-market content providers 104 in analog, digital, high-definition or other as yet defined formats. If analog signals are received, the centralized aggregation headend 102 may perform an appropriate analog-to-digital conversion. After any analog-to-digital conversion, all incoming signals are aggregated in order to form a digital aggregated content bundle. Aggregation may be performed through digital multiplexing or other similar technology. The digital aggregated content bundle is formatted so as to be compatible with existing or emerging fiber optic network technologies. For example, the digital aggregated content bundle may be formed from MPEG-2 encoded digital signals and may be encapsulated into addressable Asynchronous Transfer Mode ("ATM") packets. The digital aggregated content bundle is thus intended to be universally compatible, either in its original ATM-based format or via subsequent edge integration equipment, for distribution over a variety of last-mile deployment technologies such as xDSL, FTTH, FTTC or coaxial cable modulation. High-definition signals may be aggregated into a separate digital content bundle, if desired, for bandwidth utilization considerations.

The digital aggregated content bundle output from the centralized aggregation headend 102 is distributed over an interconnected long-haul fiber optic network 110. A switch or other appropriate network device may be used to initiate transport of the digital aggregated content bundle over the interconnected long-haul fiber optic network 110. The digital aggregated content bundle can or will be transported on multiples of fiber optic circuits and/or fiber strands. The bandwidth used by the digital aggregated content bundle will depend on compression and encoding technologies used to process the signal The interconnected long-haul fiber optic network 110 transports the digital aggregated content bundle to various local/metro points of presence ("L/M PoPs") 112 within multiple markets, shown by way of example in the figure are "Market A," "Market B," and "Market C." A L/M PoP 112 may be a central office 114. As stated previously, the interconnected long-haul fiber optic network 110 is made up of multiple interconnected fiber optic networks 107 from one or more communication network providers. The digital aggregated content bundle is transported over a fiber optic network 107 to a termination point, such as an IPoP 109 (previously defined as a Carrier Hotel or other PoP). The term "fiber optic network 107" is used herein to generically describe any fiber optic transport system, including local/metro systems, long-haul and wide area systems. Those skilled in the art will appreciate that a L/M PoP 112 may be located in the same facility as an IPoP 109. Within a IPoP 109, connections can be made to facilitate the distribution of the aggregated content into a local fiber system 113 that serves the locality where the IPoP 109 is located, or to interconnect the digital aggregated content bundle to one or more outgoing or continuing fiber optic networks 107.

When received at an intended L/M PoP 112, the digital aggregated content bundle is routed to the locally or regionally based subscribers 116 by way of a central office 114 or another facility that is accessible to the local fiber optic system 113 via a L/M PoP 112. Those skilled in the art will appreciate that fiber can be also extended to a remote terminal in some last mile delivery systems. For ease of reference, the description will hereinafter refer to central office 114 only, but such reference is intended to be interchangeable with said other facilities and/or remote terminals. A L/M PoP 112 may communicate with a central office 114 over a local or metro fiber optic system (referred to herein as local/metro fiber optic system 113), which may be a dedicated communications network. A local/metro fiber optic system 113 may utilize multiple transport technologies that are capable of transporting the digital aggregated content bundle over fiber optic networks, such as SONET, Synchronous Digital Hierarchy ("SDH"), Gig-E, IP, etc.

Central offices 114 can house equipment for handling last-mile delivery and dissemination of the digital aggregated content bundle to the subscribers premises 116. Any existing and/or emerging last-mile technology may be used to deliver the digital aggregated content bundle. If necessary to meet last-mile delivery requirements, the digital aggregated content bundle may be reformatted, rate shaped, compressed and/or otherwise manipulated by a local integration headend 115, which may be housed at the central office 114 or another appropriate facility. In addition, the local integration headend 115 may be configured to insert local or regional content, such as advertisements, local or regional programming, etc., into the digital aggregated content bundle prior to delivery to the subscriber.

The last mile delivery system connecting the central office 114 to subscribers premises 116 may be any communication channel capable of supporting the communication of compressed digital video, with the possible addition of bi-directional Internet data, PSTN services and/or POTS. By way of example, communications between a central office 114 and subscriber premises 116 may be carried over copper wire pair. Another example of a communication link between a central office 114 and a subscriber premise 116 includes, but is not limited to, a wireless communication link such as a Local Multipoint Distribution System ("LDMS"). Subscriber premises 116 may be equipped with specialized hardware and/or software for receiving, separating and processing the digital aggregated content bundle, data and other services received from a central office 114. For example, modems, filters, set top boxes, etc. may be used to receive, separate and distribute the digital aggregated content bundle, data and other services to a television set, computer, fax machine, telephone, etc. Equipment within the subscriber premise 116 may have the capability of receiving and processing high definition television or other high bit rate video content that has been aggregated at the centralized aggregation headend 102 or subsequently added to the digital aggregated content bundle at the local integration headend 115.

Figure 2:
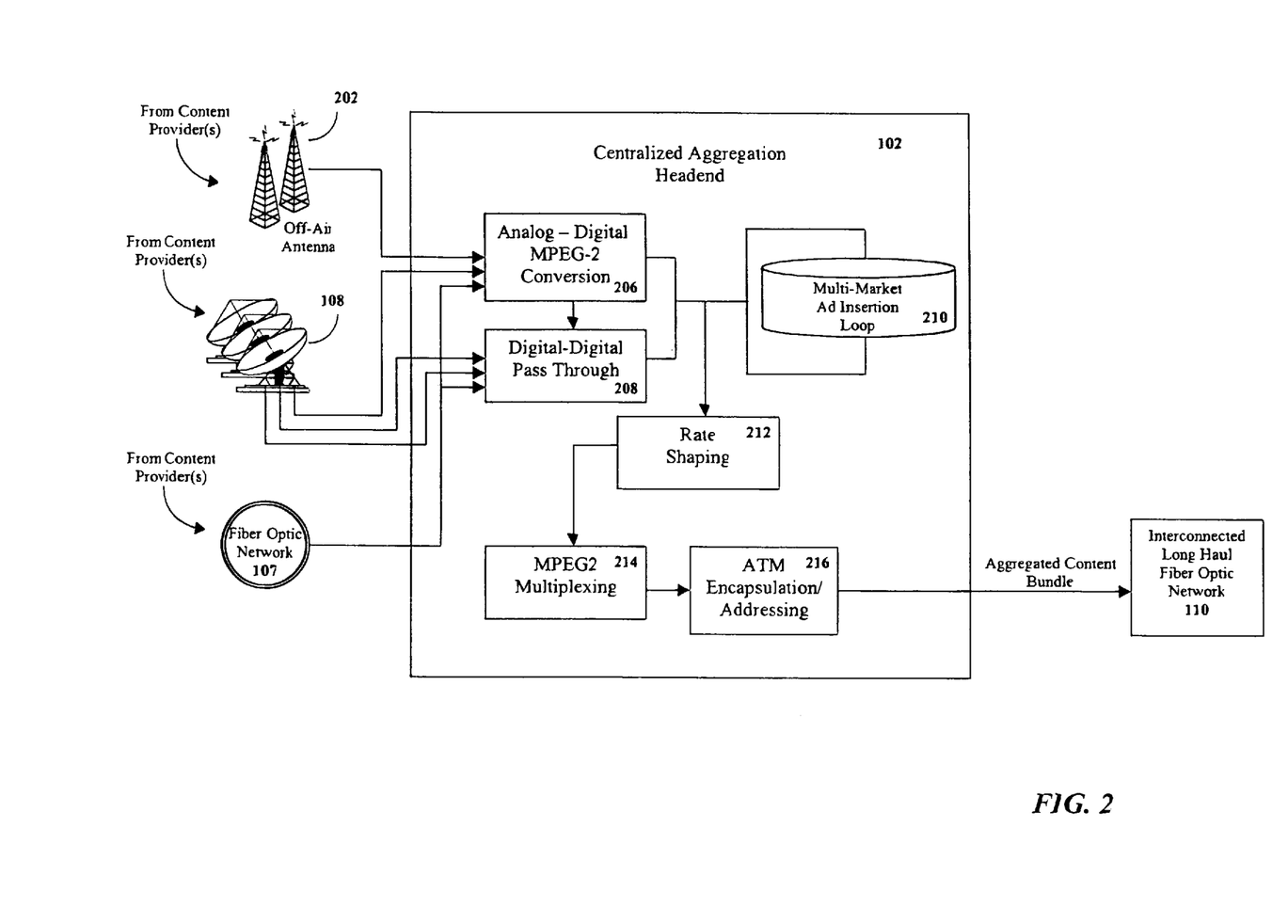
FIG. 2 is a functional block diagram illustrating the functionality of an exemplary centralized aggregation headend of the present invention.

FIG. 2 is a functional block diagram illustrating the high-level functionality of a centralized aggregation headend 102 in accordance with an exemplary embodiment of the present invention. Those skilled in the art will appreciate that the functional blocks shown are not intended to represent specific hardware or software components, multiple combinations of which might be used to achieve the illustrated functionality. The centralized aggregation headend 102 provides centralized content aggregation at a single site, much like a headend in a DBS service system architecture. However, whereas a headend in a DBS system distributes a digital aggregated content bundle to subscribers via satellite uplinks and multiple transponders, the centralized aggregation headend 102 of the present invention uses advanced interconnected fiber optic networking to integrate with telecommunications and telephone company fiber optic network infrastructures for potentially nationwide or international distribution of its digital aggregated content bundle to subscribers.

The centralized aggregation headend 102 receives multi-market content from multiple multi-market content providers 104 and aggregates the multi-market content to create a digital aggregated content bundle. In one embodiment, the digital aggregated content bundle is an ATM-based multiplex that is readily transported via most known fiber optic technologies. An ATM-based format allows the digital aggregated content bundle to be easily transported, network cross-connected, dropped off for local distribution and continued, and retained in a proven and stable environment for consistent signal quality in distribution to the telecommunications and telephone company fiber optic network infrastructures, metro area network infrastructures or other regional/local transport systems accessed via L/M PoPs 112 along interconnected long-haul fiber optic network 110. The ATM-based digital aggregated content bundle is also convertible at the edge of its distribution for preparation, grooming, modification and delivery to subscriber premises 116 over various last-mile technologies, including but not limited to xDSL. The digital aggregated content bundle can be transported long-haul via point to point connections, redundant loop connections or via interconnected networking that will support stable cross connections at IPoPs 109 and L/M PoPs 112. The digital aggregated content bundle can also be distributed with and within existing, emerging or specifically constructed segments or extensions to and from the core fiber optic transport system and on a market by market basis. Using a centralized headed architecture allows for efficient substitution of transport technology of a single location if and when transport technology used in the interconnected long-haul fiber optic network 110 are changed or upgraded.

Television programming feeds are received at the centralized aggregation head end 102 by way of an array of satellite antenna 108. Alternatively or in addition, television programming feeds may be received at the centralized aggregation head end 102 by way of off-air antenna 202 and/or fiber optic networks 107 or connections.

Within the centralized aggregation head end 102, analog television signals are converted to a digital format, using, for example, analog-to-MPEG-2 conversion 206. Any suitable analog-to-digital convert may be employed. Those skilled in the art will appreciate that other digital compression techniques may be used in place of MPEG-2 to generate the compressed digital video signal. Digital programming feeds, which are most likely transmitted from the originating multi-market content providers 104 in an MPEG-2 format, are supplied to a digital—digital pass through 208 function, which function may be performed by a suitable filter. Output signals from the analog-to-MPEG-2 conversion 206 and the digital—digital pass through 208 may optionally be passed to a multi-market ad insertion loop 210.

The multi-market ad insertion loop 210 may be configured to insert multi-market insertion content, such as advertisements, graphics or other content that is intended for viewing in multiple markets, into a television signal at designated trigger points. Multi-market insertion content may be stored, for example, in a multi-market insertion content database managed by a server within or functionally connected to the centralized aggregation headend 102. High definition television program feeds, which are most likely transmitted from the originating content provider 104 in an MPEG-2 format are also supplied to digital pass through functions and added to the digital aggregated program content.

Post conversion digital content signals, which may or may not have multi-market insertion content inserted therein, may next be supplied to a rate shaping function 212, which function may be performed by a rate shaper or other suitable hardware and/or software, in order to further step-down their bit rates. In one embodiment, the output from the centralized aggregation headend 102 is provided at a bit rate of between 2 Mbps and 6 Mbps per channel for standard television content broadcasts, and between 15.3 mbps and 19.3 mbps for high definition television broadcasts. After rate shaping, the individual digital content signals are aggregated into a single content bundle through a multiplexer, such as MPEG-2 multiplexing function 214. The digital aggregated content bundle may then be supplied to an ATM encapsulation/addressing function 216 to be formatted in an ATM-based transmission format. The ATM encapsulation/addressing function 216 prepares the digital aggregated content bundle for transport and initiates transport of the digital aggregated content bundle over the interconnected long-haul fiber optic network 110. The ATM encapsulation/addressing function 216 may be performed by a switch, such as an ATM switch, and/or a multiplexer, such as an SONET add/drop multiplexer, and/or by any other appropriate hardware and/or software.

Those skilled in the art will appreciate that an ATM-based format for the digital aggregated content bundle may be chosen due to its reliability and wide compatibility with existing fiber optic networking technologies. In alternate embodiment, other formats may be chosen for the digital aggregated content bundle. Furthermore, the present invention contemplates that multiple instances of the digital aggregated content bundle can be created, each having a different transport format. In this manner, differently formatted instances of the digital aggregated content bundle may be transported to different markets employing different last-mile technologies, thereby possibly reducing the need for reformatting or conversion of the digital aggregated content bundle within each market. Alternate formats for the digital aggregated content bundle include, but are not limited to, IP, IP wrapped ATM, ATM wrapped IP, GigE, etc.

Figure 3:
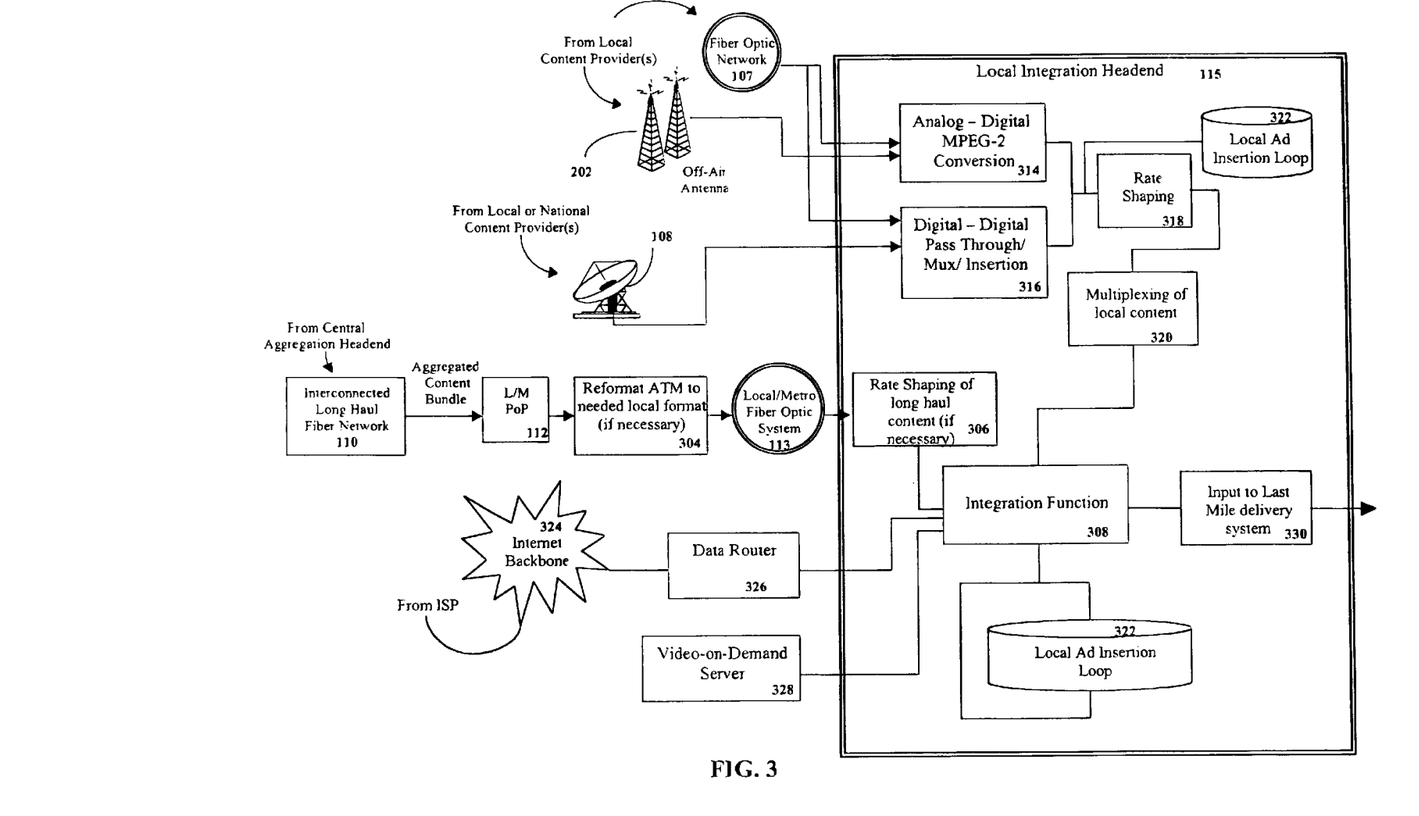
FIG. 3 is a functional block diagram illustrating the functionality of an exemplary local insertion headend of the present invention.

FIG. 3 is a functional block diagram illustrating the high-level functionality of a local integration headend 115 in accordance with exemplary embodiments of the present invention. Those skilled in the art will appreciate that the functional blocks shown are not intended to represent specific hardware or software components, multiple combinations of which might be used to achieve the illustrated functionality. The local integration headend 115 may be located, for example at a central office 114. The local integration headend 115 provides functionality for optionally and efficiently integrating the digital aggregated content bundle with regional or local programming content, local or regional advertising or other insertion content, telephony services, data services, and/or other video services, such as video-on-demand and video conferencing. Importantly, the local integration headend 115 provides the ability to add local or regional programming content into the digital aggregated content bundle downstream from the centralized aggregation headend 102. Local or regional programming content (referred to hereinafter as local programming content) may include local or regional affiliate television programming channels, local or regional advertising segments, or other locally or regionally generated content. A local integration headend 115 is preferably designed for minimal local maintenance and may be remotely accessible, maintainable and provisionable using web-based interfaces via the Internet or a closed network.

As shown in FIG. 3, a local integration headend 115 ultimately receives the digital aggregated content bundle (comprising multi-market content) from a L/M PoP 112 via a local/metro fiber optic system 113. Alternatively, and possibly more efficiently, the local integration headend 115 may be located at a L/M PoP 112. The digital aggregated content bundle may then be reformatted from its original ATM-based format to an appropriate local delivery format, if necessary. The reformatting function 304 may be performed prior to or after processing of the digital aggregated content bundle by the local integration headend 115, depending on the last-mile distribution technologies utilized by each central office 114 connected to the local/metro fiber optic system 113. When the digital aggregated content bundle is received at the local integration headend 115, it may be provided to a rate shaping function 306, which function may be performed by a rate shaper or other suitable hardware and/or software, for any necessary step-down of bit rate. After rate shaping is complete, the digital aggregated content bundle is provided to an integration function 308, where it is to be integrated with local programming content, data services, other video services and telephony services. Those skilled in the art will recognize that integration function 308 may be performed by a switch and/or multiplexer and/or other suitable hardware and/or software.

Local television programming content may be received at the local integration headend 115 from local content providers via off-air antennas 202, fiber optic networks 107 or other fiber optic connection and/or satellite antennas 108. Local programming content may be received as analog signals or digital signals. Analog signals of local programming content are converted to a digital format using an analog-to-digital converter, for example, an analog-MPEG-2 conversion function 314. Digital signals of local programming content, which are most likely transmitted from the local content providers in an MPEG-2 format, are supplied to a digital—digital pass through function 316, which may be a suitable filter. The digital—digital pass through function 316 may also perform certain multiplexing or insertion functions, if need be. Output signals from the analog-to-MPEG-2 conversion 314 and the digital—digital pass through 316 may next be supplied to local ad insertion loop 322 for insertion of local advertising or other local insertion content. After local ad insertion, if any, the signals may be passed to a rate shaping function 318, in order to step-down their bit rate. Again, a rate shaper or other suitable hardware/software may be used. After rate shaping, the digital signals of local programming content are provided to a multiplexing function 320, such as an MPEG-2 multiplexing function performed by a suitable multiplexer. The multiplexed local content signal is then provided to the integration function 308.

Video output from the integration function 308 may be fed to another local ad insertion loop 322, where local insertion content may be digitally spliced into the local programming content and/or multi-market programming content. Local insertion content may include local or regional advertising segments, graphics and other content that is intended for viewing by only the local or regional subscribers. Those skilled in the art will recognize that the video output from the integration function 308 may need to be de-multiplexed and re-multiplexed in order to accomplish the insertion of local insertion content.

The local integration headend 115 may also send and receive data to and from the Internet backbone 324 via a data router 326. Although reference is made to the Internet backbone 324, those skilled in the art will appreciate that and data network may be employed, such as a virtual private network, a private network, etc. Data received from the data router is also provided to the integration function 308. In this manner, the local integration headend 115 may connect the subscriber premises 116 to an Internet Service Provider ("ISP") accessed through appropriate last-mile delivery systems. Additionally, ISP traffic may be transported along with the digital aggregated content bundle over the interconnected long-haul fiber optic network 110. Similarly, the local integration headend 115 may be in communication with a video-on-demand server 328, which may be located locally, regionally or at the central aggregation headend 102. Output from the video-on-demand server may be supplied to the integration function 308 for integration with the other content and services to be provided to the subscriber premises 116. After all video, data and telephony content and services are integrated by the integration function 308, the integrated output undergoes final preparation for input into last mile delivery system employed by the central office 114 (shown by functional block 330.)

Most telephony architectures support some use of last-mile access to subscriber premises 116 through multiple DSL technologies ("xDSL"). xDSL methods utilize twisted pair copper wiring infrastructures that have been cross-connected to DSLAMs or nodes in central offices 114 that are fiber optically connected to a local/metro fiber optice system 113. xDSL has become a widely available telephony solution for distributing broadband products to subscriber premises 116 largely due to the fact that it was designed to exploit the use of the existing telephony infrastructure already built on a distribution by twisted pair copper access to subscriber premises 116. However, telephone companies continue to advance their deployment of fiber optics, reaching closer to their subscriber's premises with fiber optic and fiber strands; thus, paving the way for more robust, non-copper distribution to homes or businesses. As an example, a last-mile delivery system may include Passive Optical Networking ("PON") in Fiber-to-the-home ("FTTH") or Fiber-to-the-curb (FTTC) delivery systems. In another embodiment, the digital aggregated content bundle may be converted at the local integration headend 115 to supply aggregated content to certain advanced digital coaxial cable distribution methods that employ Quadrature Amplitude Modulation ("QAM").

Figure 4:
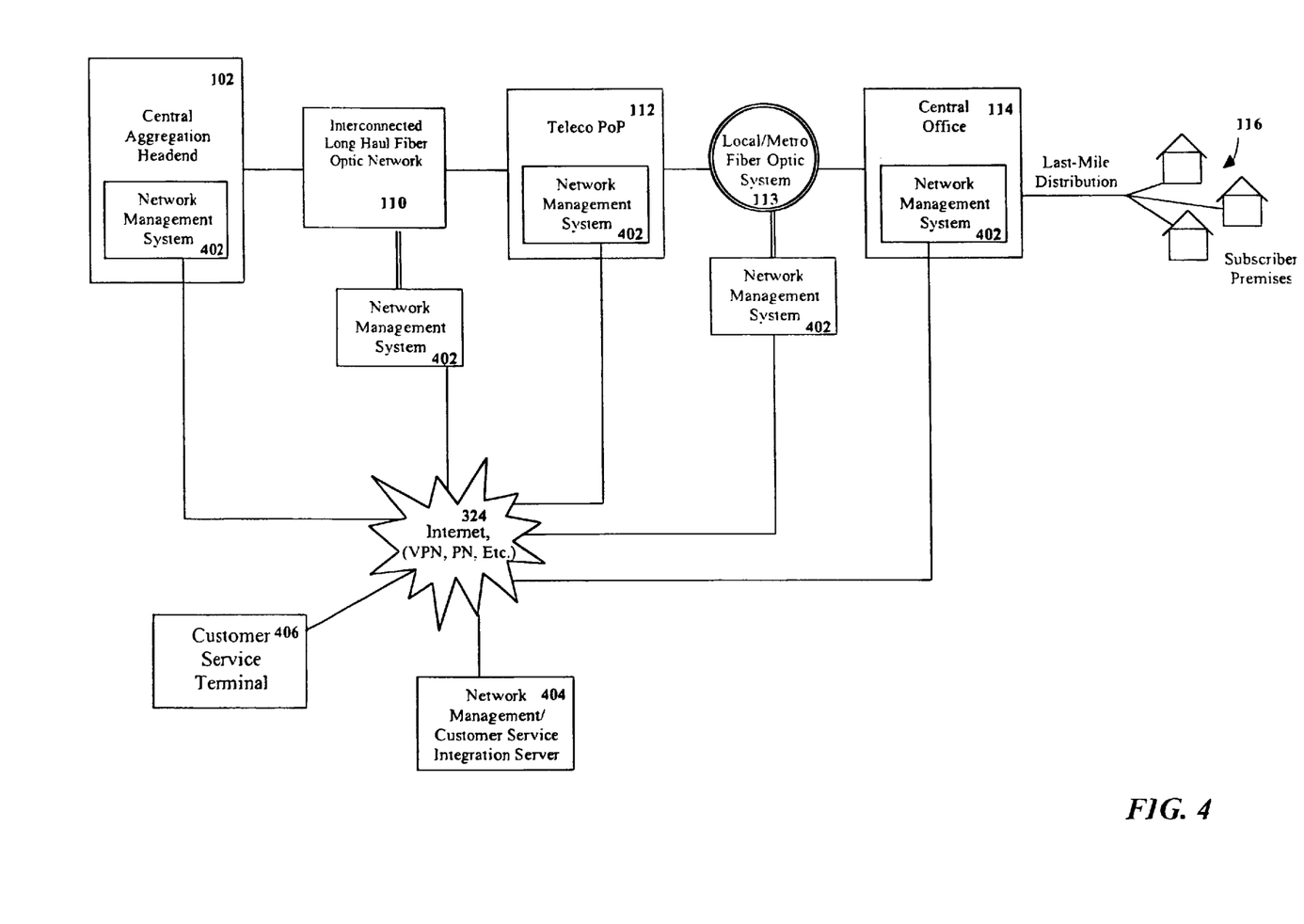
FIG. 4 is a functional block diagram illustrating a centralized customer service platform according to exemplary embodiments of the present invention.

In certain embodiments, the present invention also provides a centralized customer service platform. Centralized customer service capabilities may be necessitated by the potentially national or international distribution capability of the above described systems and method of the present invention. As shown in FIG. 4, unique network management systems 402 may be provided at various points in the system architecture. Each network management system 402 may be a computer or other processor-driven device that is configured to monitor a particular network system, device or segment and to gather the network's state and status data, with respect to network devices, segments or other systems. For example, network management systems 402 may be employed at the centralized aggregation headend 102, at each L/M PoP 112, at each central office 114 and at one or more points within each interconnected long-haul fiber optic network 110 and local fiber optic system 113. The network management system 402 at the central office may further provide back-office services, such as provisioning, billing, etc.

Each network monitoring system 402 may communicate state and status data to a network management/customer service integration server 404, located locally or at points between or extending back to the system and the centralized head end, for example via the Internet backbone 324. Different network management systems 402 may report state and status data in different formats. For example, a network management systems 402 at a L/M PoP 112 or at a central office 114 may report different types of data, using different standards or protocols, than a network management system 402 monitoring a segment of an interconnected long-haul fiber optic network 110. Accordingly, the network management/customer service integration server 404 may be configured to convert and/or interpret all state and status data into a common format that is easily understood in real time by a customer service representative.

The network management/customer service integration server 404 may provide a graphical user interface that allows a customer service representative to determine characteristics of the system on an end-to-end basis. In a preferred embodiment, the network management/customer service integration server 404 provides a web-based interface that can be access using a customer service terminal 406 executing a web browser from any location with an Internet connection. State and status data can accessed by a customer service representative in real-time or near real-time to determine the characteristics of a network system, device or segment. The network management/customer service integration server 404 may also store state and status data in a database for later analysis and reporting.

Figure 5:
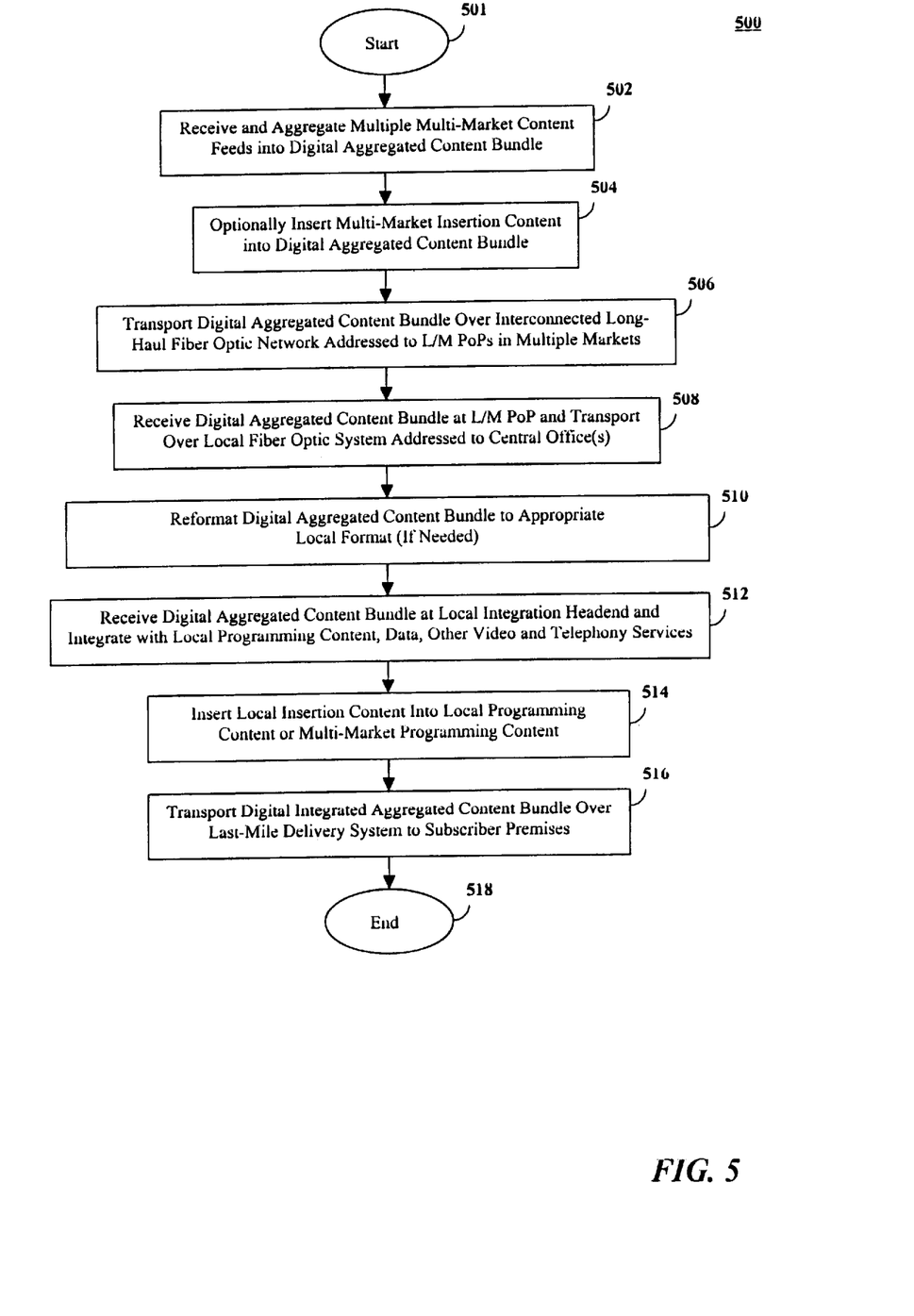
FIG. 5 is a flow diagram illustrating an exemplary process flow within an exemplary end-to-end content delivery system of the present invention.

FIG. 5 is a flow diagram illustrating an exemplary process flow within an exemplary end-to-end content delivery system of the present invention. The exemplary method begins at start step 501 and progresses to step 502, where multiple multi-market content feeds of live broadcast television programming are received and aggregated into an digital aggregated content bundle. Next at step 504, multi-market insertion content, such as national advertising segments, may optionally be inserted into the television programming within the digital aggregated content bundle. At step 506 the digital aggregated content bundle is transported over an interconnected long-haul fiber optic network 110 that may be connected by a series of IPoPs 107 and further addressed to L/M PoPs 112 in multiple markets. In this manner, the digital aggregated content bundle can be transported potentially nationwide or internationally over a closed, terrestrial, very wide area network that is derived from readily available fiber optic assets.

When the digital aggregated content bundle reaches a L/M PoP 112 at step 508, it is transported around (or throughout) a metro market over a local fiber optic system 113 and is addressed to the appropriate central offices 114. As shown in step 510, the digital aggregated content bundle may be reformatted to an appropriate local transport format, if necessary. Alternatively, reformatting may be performed after the completion of step 514, below. The digital aggregated content bundle is received at a local integration headend 112 at step 512, where it can be integrated with local programming content, data, other video services and telephony services. At step 514, local insertion content may be inserted (e.g., digitally spliced) into the local and/or multi-market television programming content within the integrated content bundle. The digital integrated aggregated content bundle is then transported over a last-mile delivery system to subscriber premises 116 at step 516. The exemplary method 500 then ends at step 518. As mentioned above, state and status data regarding any and all network systems, devices and segments may be collected and reported to a network management/customer service integration server 404 during processing of the exemplary method 500. Accordingly, the quality of service delivered to the subscriber through the exemplary method 500 may be monitored in real-time or near real-time.

In view of the foregoing, it may be seen that the present invention provides systems and overall integration methods (end-to-end methods) for centralized aggregation of broadcast television programming originated by multiple content providers and for delivery of a digital aggregated content bundle to subscribers in multiple markets over terrestrial interconnected long haul fiber optic networks. Although various exemplary embodiments of the present invention have been described, many other modifications and additional features will become evident to those of skill in the art. It should be understood, therefore, that the foregoing relates only to certain embodiments of the invention, and that numerous changes may be made therein without departing from the spirit and scope of the invention as defined by the following claims.

I claim:

1. A system for delivering broadcast television programming to subscribers in multiple markets comprising:
   a centralized aggregation headend for receiving multiple broadcast television signals, comprising multi-market programming content from multiple content providers and for aggregating said multiple broadcast television signals into a digital aggregated content bundle;
   an interconnected long-haul fiber optic network, comprising multiple fiber optic networks that are interconnected by a plurality of interconnection points of presence (IPoPs), for transporting the digital aggregated content bundle from the centralized aggregation headend to a plurality of local/metro points of presence (L/M PoPs), each L/M PoP being located in a different market;
   a plurality of central offices interconnected with at least one of the L/M PoPs via one or more local fiber optic systems, each of the central offices configured for receiving the digital aggregated content bundle via at least one of the local fiber optic systems and for transporting the digital aggregated content bundle to the subscriber premises over a last-mile delivery system;
   a network management/customer service integration server in communication with a plurality of network management systems, at least one each of the network management systems being located at the centralized aggregation headend, at the plurality of IPoPs, at the plurality of L/M PoPs, at the plurality of central offices, at one or more segments of the interconnected long-haul fiber optic network, and at one or more segments of each local fiber optic system; and
   wherein the network management/customer service integration server receives state and status data from each of the network management systems and integrates the state and status data for presentation to a customer service representative through a user interface.

2. The system of claim 1, wherein the user interface is a web-based interface that is accessible through a data network by a customer service terminal executing a browser and connected to the data network.

3. The system of claim 1, wherein the network management/customer service integration server communicates with the plurality of network management systems via a data network.

4. The system of claim 1, wherein at least one of the multiple broadcast television signals is received at the centralized aggregation headend as an analog signal; and
   wherein the centralized aggregation headend is configured to convert the analog signal to a digital signal prior to aggregating said multiple broadcast television signals into the digital aggregated content bundle.

5. The system of claim 1, wherein the digital aggregated content bundle comprises a plurality of MPEG-2 digital signals.

6. The system of claim 1, wherein the centralized aggregation headend aggregates said multiple broadcast television signals into the digital aggregated content bundle using digital multiplexing.

7. The system of claim 1, wherein the centralized aggregation headend is further configured to insert multi-market insertion content into the multi-market programming content within the digital aggregated content bundle.

8. The system of claim 1, wherein the digital aggregated content bundle is created in an ATM-based format.

9. The system of claim 1, further comprising a local integration headend configured for receiving the digital aggregated content bundle prior to transport thereof to the subscriber and for adding local programming content to the digital aggregated content bundle.

10. The system of claim 9, wherein the local integration headend is located in one of the central offices.

11. The system of claim 9, wherein the local integration headend is located in a facility that is accessible to the local fiber optic network via at least one of the L/M PoPs.

12. The system of claim 9, wherein the local integration headend is further configured for inserting local insertion content into the local programming content.

13. The system of claim 9, wherein the local integration headend is further configured for inserting local insertion content into the multi-market programming content.

14. The system of claim 9, wherein the local integration headend is further configured for integrating data services with the digital aggregated content bundle.

15. The system of claim 9, wherein the local integration headend is further configured for integrating two-way video services with the digital aggregated content bundle.

16. The system of claim 9, wherein the local integration headend is further configured for integrating video on demand services with the digital aggregated content bundle.

* * * * *